United States Patent
Paramasivam et al.

(10) Patent No.: US 10,446,894 B2
(45) Date of Patent: Oct. 15, 2019

(54) ARRAY PLATE ASSEMBLIES FOR APPLYING COMPRESSIVE SPRING FORCES AGAINST BATTERY CELL STACKS

(71) Applicant: FORD GLOBAL TECHNOLOGIES, LLC, Dearborn, MI (US)

(72) Inventors: Saravanan Paramasivam, South Lyon, MI (US); Kimberley King, Northville, MI (US); Dave Moschet, Dearborn, MI (US); Bhaskara Boddakayala, Troy, MI (US); Rajaram Subramanian, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 15/653,611

(22) Filed: Jul. 19, 2017

(65) Prior Publication Data

US 2019/0027797 A1   Jan. 24, 2019

(51) Int. Cl.
| | |
|---|---|
| *H01M 10/0525* | (2010.01) |
| *H01M 10/6554* | (2014.01) |
| *H01M 10/63* | (2014.01) |
| *H01M 6/50* | (2006.01) |
| *H01M 10/28* | (2006.01) |
| *H01M 2/10* | (2006.01) |
| *H01M 10/04* | (2006.01) |
| *H01M 10/625* | (2014.01) |
| *H01M 2/20* | (2006.01) |

(52) U.S. Cl.
CPC ..... *H01M 10/6554* (2015.04); *H01M 2/1077* (2013.01); *H01M 6/5038* (2013.01); *H01M 10/0481* (2013.01); *H01M 10/281* (2013.01); *H01M 10/63* (2015.04); *H01M 2/206* (2013.01); *H01M 10/625* (2015.04); *H01M 2220/20* (2013.01)

(58) Field of Classification Search
CPC .................. H01M 10/0525; H01M 10/613
See application file for complete search history.

(56) References Cited

U.S. PATENT DOCUMENTS

| | | | |
|---|---|---|---|
| 5,422,196 A | 6/1995 | Klein | |
| 6,899,975 B2 * | 5/2005 | Watanabe | H01M 2/0262 429/156 |
| 2003/0232233 A1 * | 12/2003 | Andrews | H01M 8/241 429/460 |
| 2006/0216580 A1 * | 9/2006 | Schlosser | H01M 2/1016 429/97 |
| 2009/0208837 A1 * | 8/2009 | Lin | H01M 6/425 429/158 |
| 2011/0262785 A1 | 10/2011 | Johnson et al. | |
| 2013/0022848 A1 | 1/2013 | Schroeter et al. | |

FOREIGN PATENT DOCUMENTS

| | | |
|---|---|---|
| EP | 0 892 449 A1 | 1/1999 |
| KR | 100595038 B1 | 6/2006 |
| WO | 99/05743 | 2/1999 |

* cited by examiner

*Primary Examiner* — Olatunji A Godo
(74) *Attorney, Agent, or Firm* — Carlson, Gaskey & Olds

(57) ABSTRACT

A battery assembly includes a grouping of battery cells and an array plate assembly contacting at least one cell of the grouping of battery cells. The array plate assembly including a spring plate adapted to exert a compressive spring force against the at least one cell. The compressive spring force may be based on a dimensional profile of the grouping of battery cells.

25 Claims, 7 Drawing Sheets

ARRAY PLATE ASSEMBLIES FOR APPLYING COMPRESSIVE SPRING FORCES AGAINST BATTERY CELL STACKS

TECHNICAL FIELD

This disclosure relates to battery assemblies for electrified vehicle battery packs. An exemplary battery assembly includes an array plate assembly for exerting a compressive spring force against a grouping of battery cells.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells generate heat during charging and discharging operations. From time to time, such as when charging the battery cells, the external profile of the battery cells may bulge or swell. The bulging may cause inconsistent cell stack dimensions, thereby leading to packaging challenges.

SUMMARY

A battery assembly according to an exemplary aspect of the present disclosure includes, among other things, a grouping of battery cells and an array plate assembly contacting at least one cell of the grouping of battery cells. The array plate assembly includes a spring plate adapted to exert a compressive spring force against the at least one cell.

In a further non-limiting embodiment of the foregoing battery assembly, the array plate assembly is positioned at a longitudinal extent of the grouping of battery cells.

In a further non-limiting embodiment of either of the foregoing battery assemblies, the array plate assembly is positioned along a side of the grouping of battery cells.

In a further non-limiting embodiment of any of the foregoing battery assemblies, the spring plate includes a spring feature movable between an expanded position and a retracted position as a profile of the at least one cell changes.

In a further non-limiting embodiment of any of the foregoing battery assemblies, the profile is alterable between a first profile and a second profile that is at least partially bulged relative to the first profile.

In a further non-limiting embodiment of any of the foregoing battery assemblies, the spring plate includes a plate body and a spring feature that protrudes from the plate body.

In a further non-limiting embodiment of any of the foregoing battery assemblies, the assembly contains a second spring feature that protrudes from the plate body.

In a further non-limiting embodiment of any of the foregoing battery assemblies, the array plate assembly includes an outer plate and an inner plate, and the spring plate extends between the outer plate and the inner plate.

In a further non-limiting embodiment of any of the foregoing battery assemblies, the spring plate includes a contacting surface contiguous with the inner plate and an outer perimeter contiguous with the outer plate.

In a further non-limiting embodiment of any of the foregoing battery assemblies, the spring plate includes a spring feature having a contacting surface and a plurality of webs.

In a further non-limiting embodiment of any of the foregoing battery assemblies, at least one of the contacting surface and the plurality of webs is flexible in response to a dimensional change of the grouping of battery cells.

In a further non-limiting embodiment of any of the foregoing battery assemblies, each of the plurality of webs extends between the contacting surface and an outer perimeter of the spring plate.

In a further non-limiting embodiment of any of the foregoing battery assemblies, an opening is disposed between adjacent webs of the plurality of webs.

In a further non-limiting embodiment of any of the foregoing battery assemblies, the spring plate includes a first spring feature and a second spring feature adjacent to the first spring feature.

In a further non-limiting embodiment of any of the foregoing battery assemblies, a center beam extends between the first spring feature and the second spring feature.

A method according to another exemplary aspect of the present disclosure includes, among other things, applying a compressive spring force against a grouping of battery cells of a battery assembly with an array plate assembly, the array plate assembly including a spring plate for exerting the compressive spring force based on a dimensional profile of the grouping of battery cells.

In a further non-limiting embodiment of the foregoing method, a spring feature of the spring plate moves toward a retracted position in response to at least one cell of the grouping of battery cells moving toward a more bulged profile.

In a further non-limiting embodiment of either of the foregoing methods, a spring feature of the spring plate moves toward an expanded position in response to at least one cell of the grouping of battery cells moving toward a less bulged profile.

In a further non-limiting embodiment of any of the foregoing methods, a spring feature of the spring plate includes a contacting surface contiguous with either at least one cell of the grouping of battery cells or an inner plate of the array plate assembly.

In a further non-limiting embodiment of any of the foregoing methods, the spring feature includes a plurality of flexible webs, and at least one of the contacting surface and the plurality of flexible webs moves in response to a change in the dimensional profile in order to maintain the compressive spring force.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details battery assemblies for use within electrified vehicle battery packs. An exemplary battery assembly includes a grouping of battery cells and an array plate assembly contacting at least one cell of the grouping of battery cells. The array plate assembly includes one or more spring features adapted to exert a compressive spring force against the grouping of battery cells. The compressive spring force maintains a compressive force against the grouping of battery cells. The compressive force ensures more consistent cell stack dimensions notwithstanding any battery cell thickness variations. These and other features of this disclosure are discussed in greater detail in the following paragraphs of this detailed description.

Figure 1:
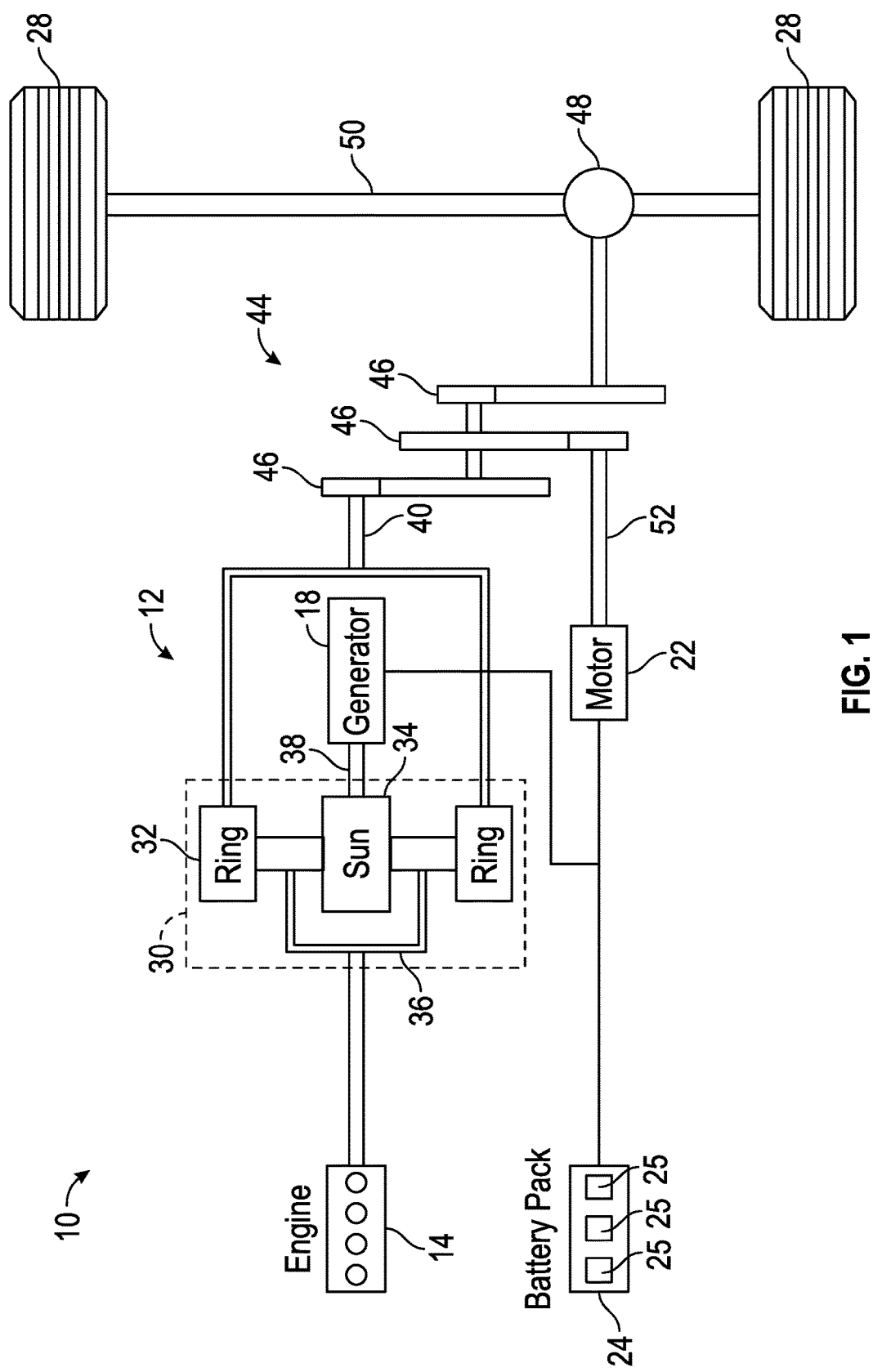
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
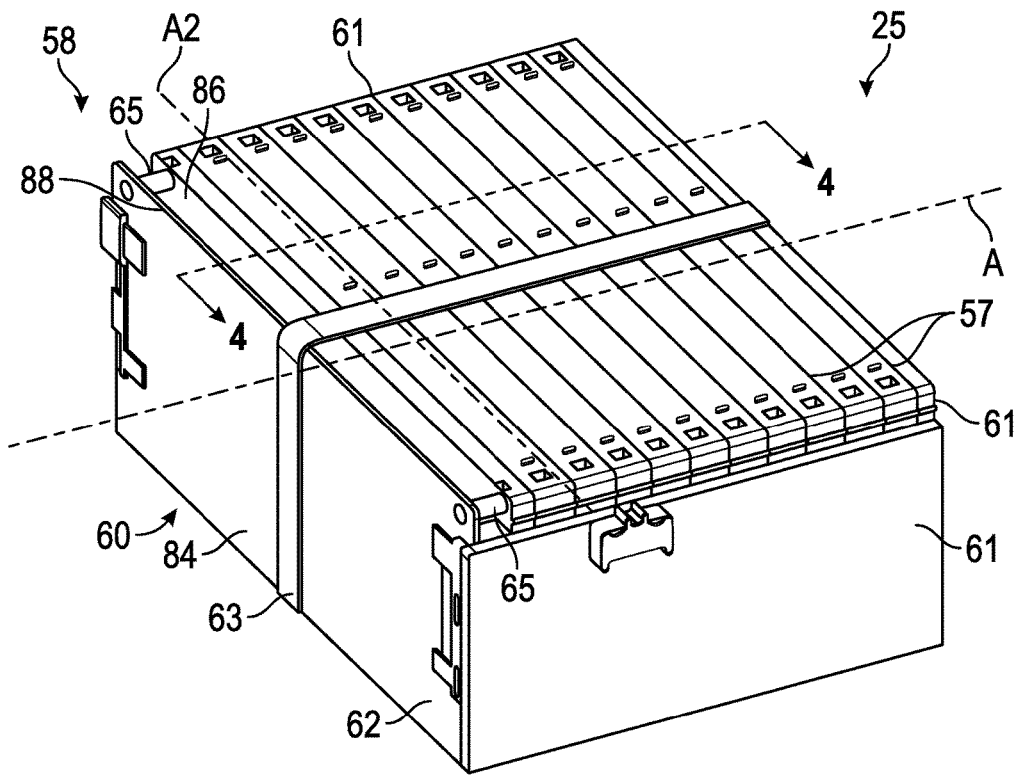
FIG. 2 illustrates a battery assembly of an electrified vehicle.
Figure 3:
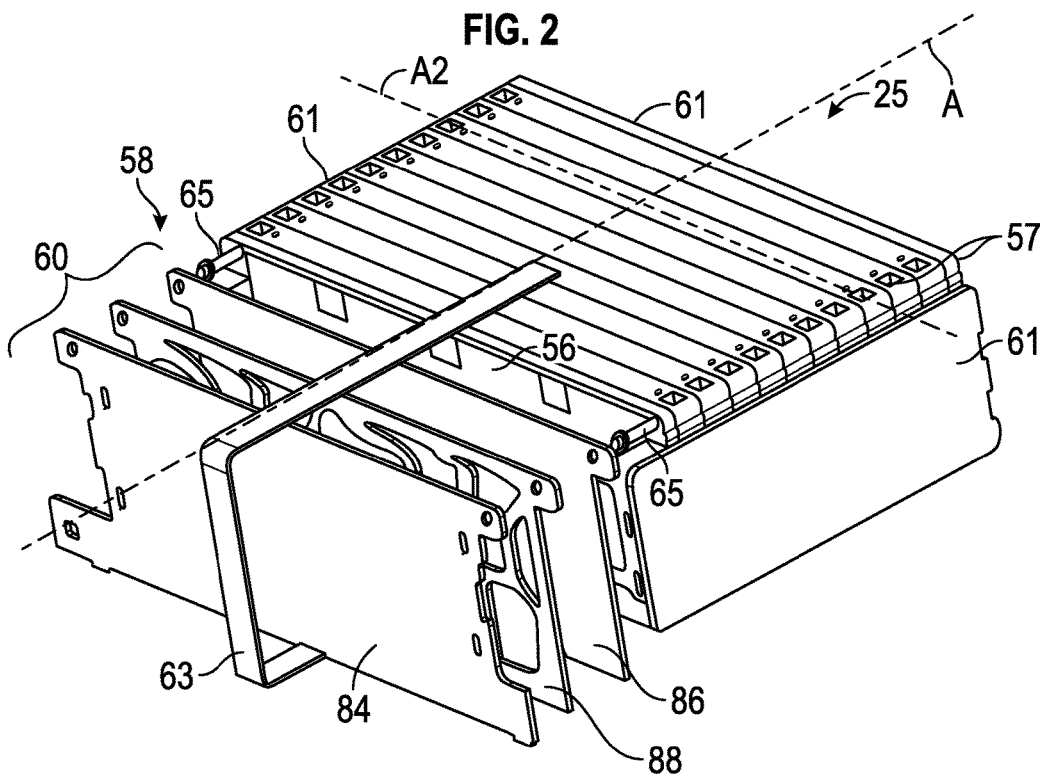
FIG. 3 is an exploded view of the battery assembly of FIG. 2.
Figure 4:
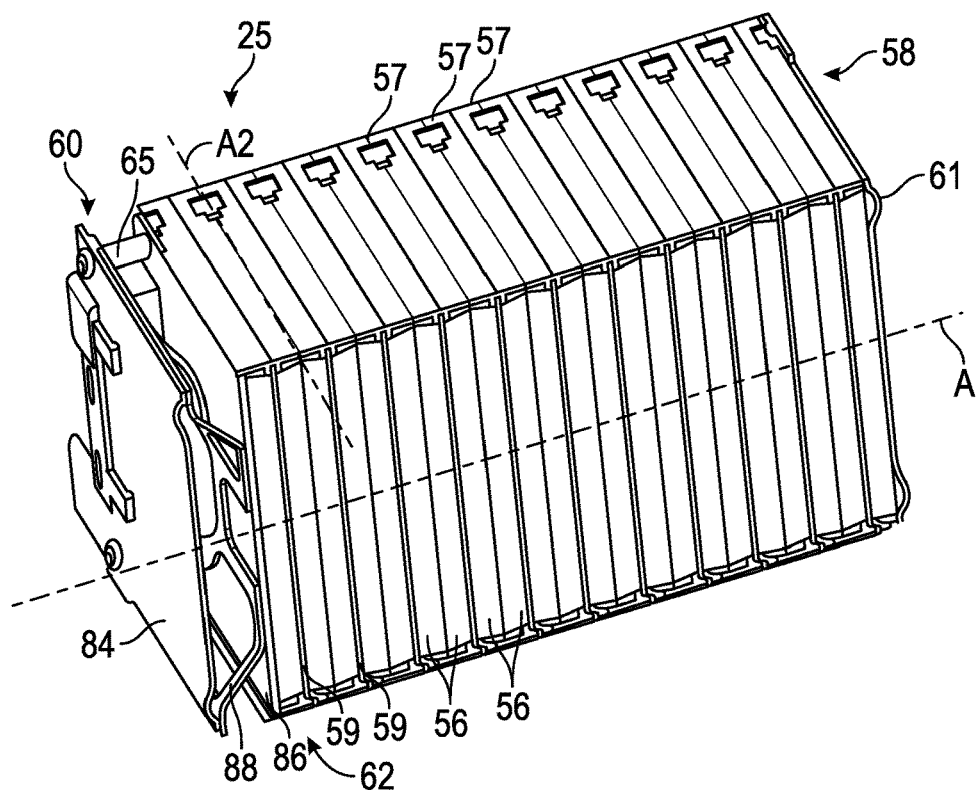
FIG. 4 is a cross-sectional view of the battery assembly of FIG. 2.
Figure 5:
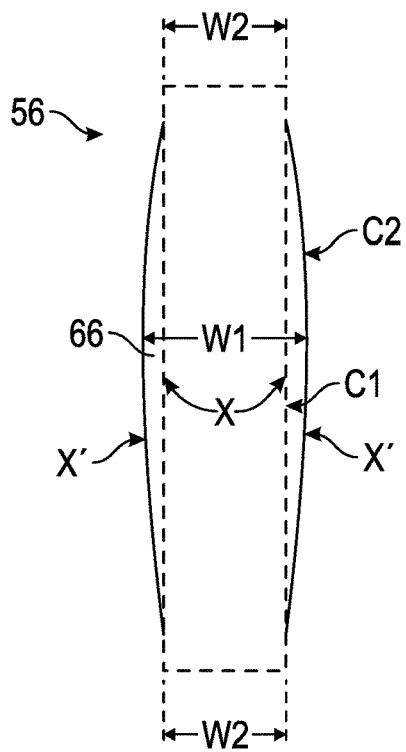
FIG. 5 illustrates a battery cell of the battery assembly of FIG. 2.

FIGS. 2, 3, and 4 illustrate a battery assembly 25 that can be employed within an electrified vehicle. For example, the battery assembly 25 could be a component of the battery pack 24 of the electrified vehicle 12 shown in FIG. 1. The battery assembly 25 includes a plurality of battery cells 56 that store energy for powering various electrical loads of the electrified vehicle 12. Although a specific number of battery cells are depicted in FIGS. 2-4, the battery assembly 25 could employ a greater or fewer number of cells within the scope of this disclosure. In other words, this disclosure is not limited to the specific configuration shown in FIGS. 2-4.

The battery cells 56 may be stacked side-by-side along a longitudinal axis A to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both, could alternatively be utilized within the scope of this disclosure.

The battery cells 56 may be held within array frames 57. Each array frame 57, for example, may hold one or more battery cells 56. In an embodiment, a thermal fin 59 (see FIG. 4) is also held by the array frames 57. The thermal fins 59 can be positioned between adjacent battery cells 56 of the cell stack to thermally manage any heat generated by the battery cells 56.

The battery cells 56 of the battery assembly 25 may be supported by a support structure 58 disposed around an outer perimeter of the cell stack. In an embodiment, the support structure 58 includes one or more array plate assemblies 60 and multiple support plates 61. Together, the array plate assembly 60 and the support plates 61 may be interconnected to axially constrain the battery cells 56 in the stacked configuration.

The support structure 58 may optionally include one or more bindings 63 and one or more rods 65. The rods 65 may extend through the array plate assembly 60 and the array frames 57 to help axially constrain the battery cells 56.

Each array plate assembly 60 may include an outer plate 84, an inner plate 86, and a spring plate 88 disposed between the outer plate 84 and the inner plate 86. The inner plate 86 is contiguous with at least one of the battery cells 56, and the outer plate 84 is spaced part from and therefore non-contiguous with the battery cells 56. As discussed in greater detail below, the spring plate 88 is configured to apply a compressive spring force against the cell stack of the battery assembly 25.

In an embodiment, the battery assembly 25 includes a single array plate assembly 60 disposed at a longitudinal extent 62 of the battery assembly 25. In this embodiment, the array plate assembly 60 acts as an end plate of the support structure 58 and extends in parallel with longitudinal axes A2 of the battery cells 56.

Figure 6:
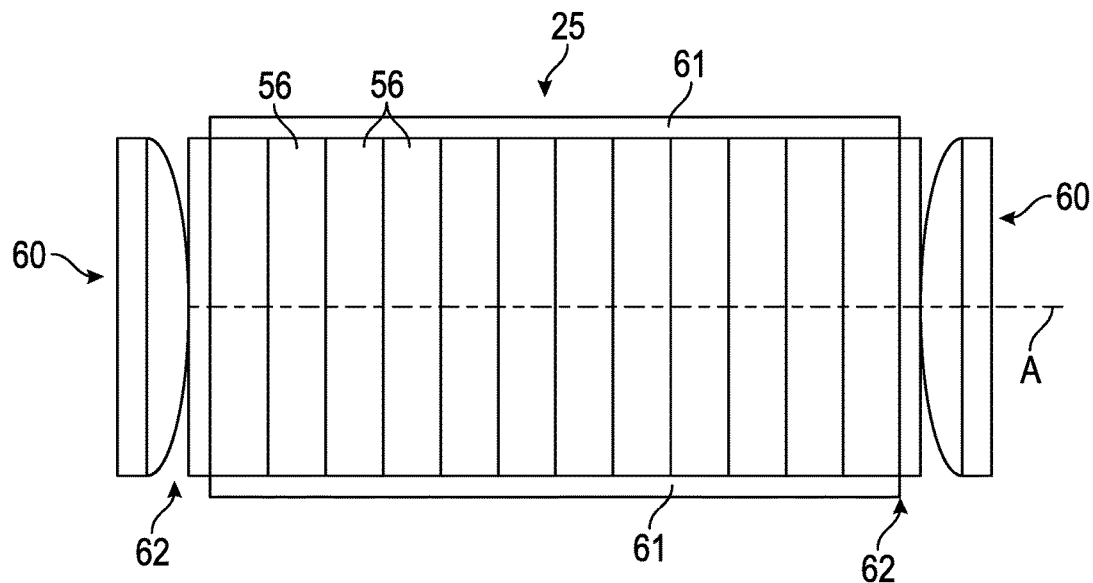
FIG. 6 illustrates another exemplary battery assembly.

In another embodiment, the battery assembly 25 may include two array plate assemblies 60. In this embodiment, one array plate assembly 60 is disposed at each longitudinal extent 62 of the battery assembly 25 (see, e.g., FIG. 6).

Figure 7:
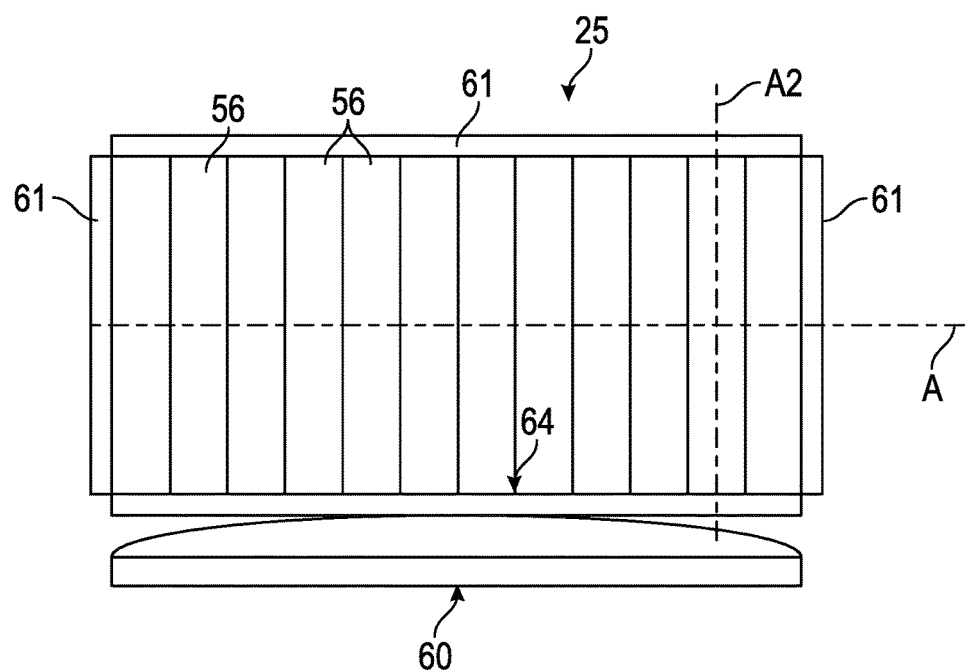
FIG. 7 illustrates another exemplary battery assembly.

In another embodiment, the array plate assembly 60 is disposed along one side 64 of the battery assembly 25 (see, e.g., FIG. 7). In this embodiment, the array plate assembly 60 acts as a side plate of the support structure 58 and extends perpendicularly to the longitudinal axes A2 of the battery cells 56.

Figure 8:
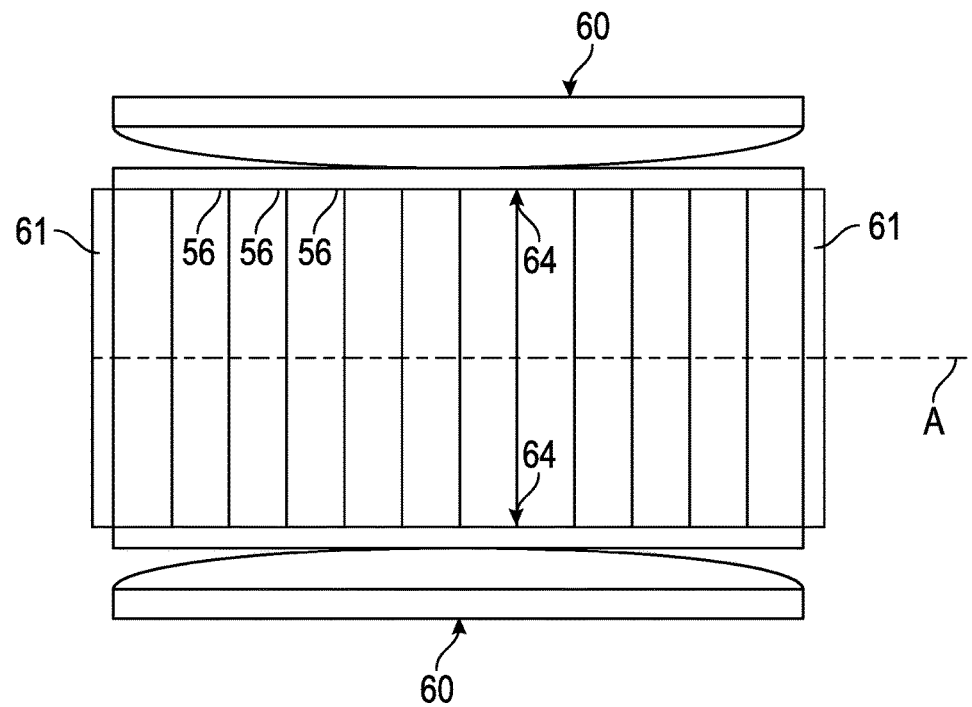
FIG. 8 illustrates yet another exemplary battery assembly.

In yet another embodiment, the battery assembly 25 includes two array plate assemblies 60. In this embodiment, one array plate assembly 60 is disposed on each side 64 of the battery assembly 25 (see, e.g., FIG. 8).

Figure 9:
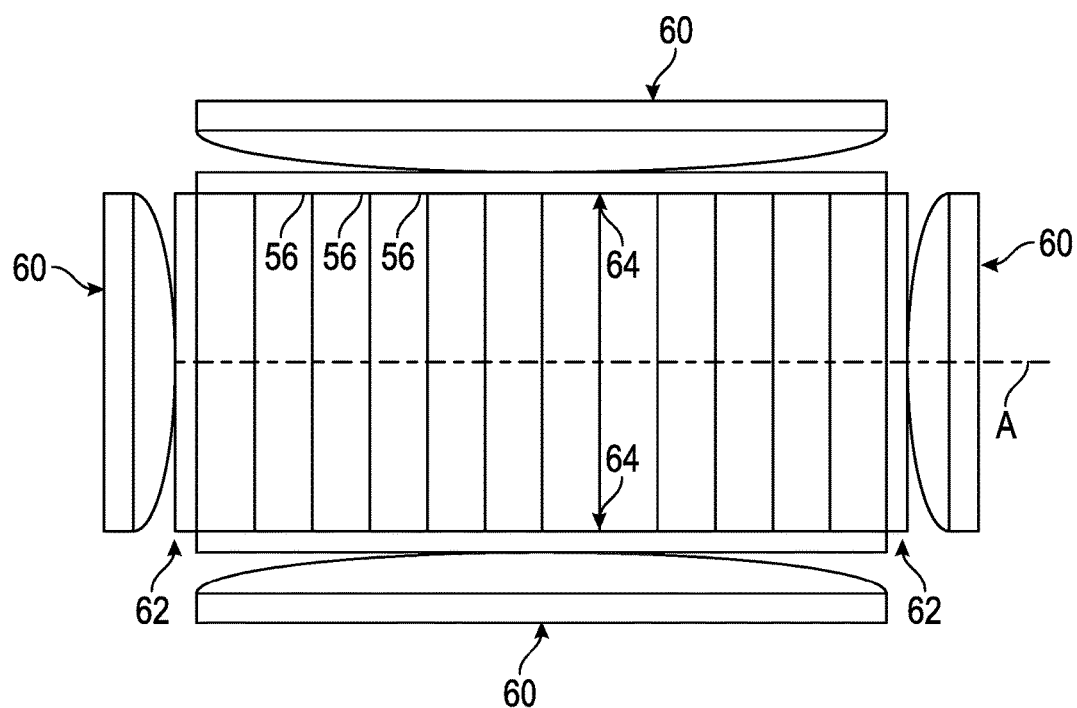
FIG. 9 illustrates yet another exemplary battery assembly.

In yet another embodiment, the support structure 58 includes array plate assemblies 60 disposed along both the longitudinal extents 62 and the sides 64 of the battery assembly 25 (see, e.g., FIG. 9). In this embodiment, the battery assembly 25 includes four total array plate assemblies 60. The total number of array plate assemblies 60 and support plates 61 utilized within the battery assembly 25 is design specific and may depend on the amount of compressive force necessary to maintain consistent cell stack dimensions.

Referring now to FIGS. 2-5, one or more of the battery cells 56 of the battery assembly 25 may bulge, swell, or otherwise expand during certain conditions, such as charging and discharging conditions. For example, one or more of the battery cells 56 of the battery assembly 25 may bulge, swell, or expand between a first position X (shown in phantom lines) and a second positon X' (shown in solid lines). The battery cells 56 may bulge to any position between the first position X and the second position X'. The battery cells 56 may bulge in response to heat generation or chemical reactions that occur inside the battery cells 56.

In an embodiment, the first position X of the battery cell 56 generally refers to an uncharged profile of the battery cell 56 and the second position X' generally refers to a charged profile. An exterior casing 66 of the battery cell 56 may include a first contour C1 that is generally planar (or less bulged) in the first position X and a second contour C2 that is generally non-planar (or more bulged) in the second position X'. The varying profiles of the battery cells 56 of the battery assembly 25 can lead to inconsistent cell stack dimensions. For example, the overall length of the battery assembly 25 may become larger when one or more battery cells 56 bulge toward the second position X'. To address this issue, one or more of the array plate assemblies 60 of the support structure 58 may include spring features for exerting a compressive spring force against the cell stack in order to maintain more consistent cell stack dimensions despite the varying profiles of the battery cells 56. Exemplary spring plates equipped with such spring features are discussed in greater detail below.

Figure 10:
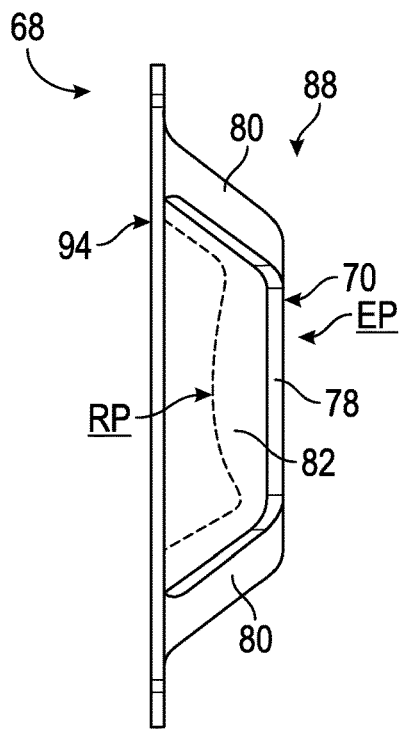
FIG. 10 is a side view of an exemplary spring plate for a battery assembly.
Figure 11:
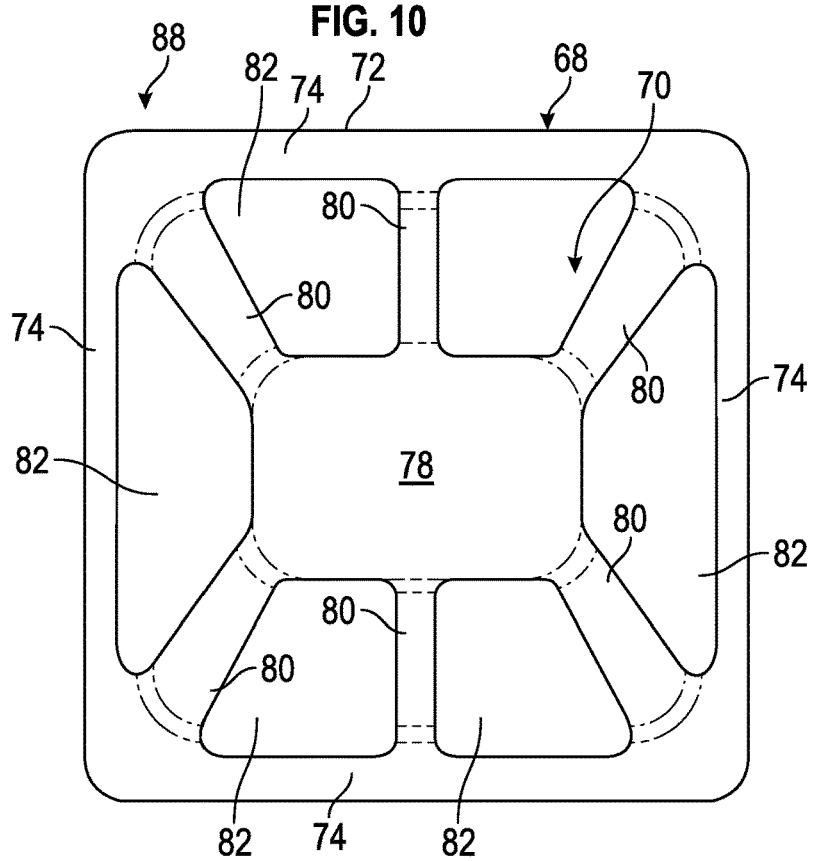
FIG. 11 is a front view of the spring plate of FIG. 10.
Figure 12:
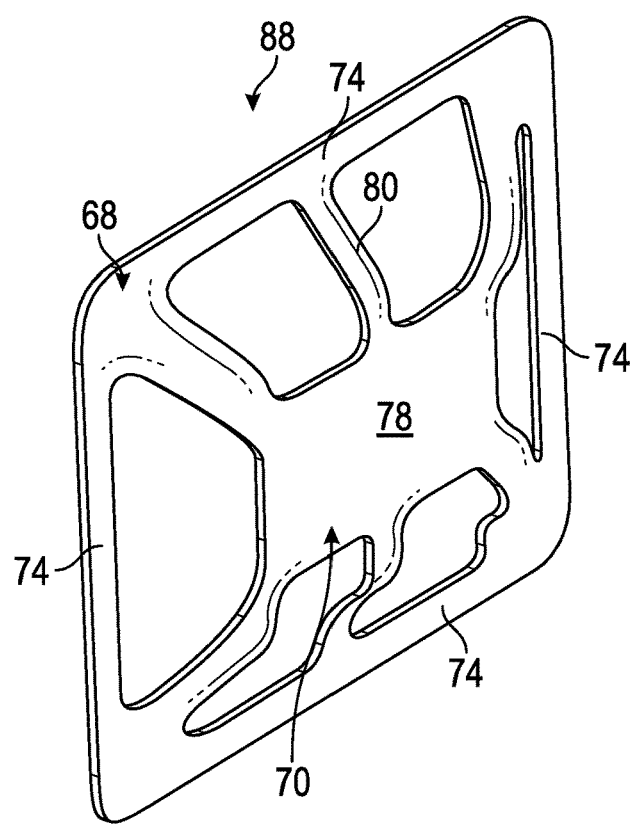
FIG. 12 is a perspective view of the spring plate of FIG. 10.

FIGS. 10, 11, and 12, with continued reference to FIGS. 2-5, illustrate an exemplary spring plate 88 for the array plate assembly 60 of the battery assembly 25. The spring plate 88 includes a plate body 68 and a spring feature 70 that protrudes from the plate body 68. When the array plate assembly 60 is mounted to the battery assembly 25, the plate body 68 of the spring plate 88 may contact the outer plate 84 of the array plate assembly 60 and the spring feature 70 may contact the inner plate 86 of the array plate assembly 60 (see, e.g., FIG. 4).

In an embodiment, the plate body 68 and the spring features 70 are integrally formed with one another to provide the spring plate 88. The spring plate 88 is therefore considered to be a monolithic part that excludes any mechanical attachments.

In the illustrated embodiment, the spring plate 88 includes a single spring feature 70. However, it should be understood that the spring plate 88 could be designed to include any amount of spring features 70 within the scope of this disclosure. The total number of spring features 70 designed into the spring plate 88 may depend on the amount of compressive force required to maintain compression on the battery assembly 25.

The plate body 68 of the spring plate 88 includes an outer perimeter 72 established by a plurality of beams 74. In an embodiment, the outer perimeter 72 is a rectangular perimeter. In another embodiment, the outer perimeter 72 is a square perimeter. However, other shapes are also contemplated within the scope of this disclosure.

The spring feature 70 of the spring plate 88 may include a contacting surface 78 and a plurality of webs 80 that connect between the contacting surface 78 and the beams 74 of the plate body 68. The contacting surface 78 is generally flat and contacts the inner plate 86 or at least one battery cell 56 when the array plate assembly 60 is mounted within the battery assembly 25 (see, e.g., FIGS. 2-4). Openings 82 may extend between adjacent webs 80 of the spring feature 70.

The configuration of the webs 80 and the openings 82 gives the spring features 70 "spring-like" characteristics. For example, as one or more battery cells 56 of the battery assembly 26 bulge toward their second positions X' (see FIG. 5), the webs 80, the contacting surfaces 78, or both, may flex (e.g., exhibit elastic deformation) toward a retracted position RP (see FIG. 10). In the retracted position RP, the spring feature 70 has moved toward the plate body 68 and therefore has moved in a direction away from the cell stack (i.e., toward the outer plate 84). Moreover, as the battery cells 56 move back toward their first positions X, the webs 80, the contacting surfaces 78, or both, may flex back toward their expanded positions EP, or back toward the cells stack (i.e., toward the inner plate 86). Thus, the spring features 70 are able to compensate for any dimensional variations in the cell stack.

Once the array plate assembly 60 has been mounted to the battery assembly 25, the spring feature 70 bulges from the plate body 68 in a direction toward the battery cells 56. In an embodiment, the spring feature 70 selectively exerts a compressive spring force against the inner plate 86 of the array plate assembly 60 to maintain a compressive force across the battery cells 56 of the battery assembly 25 (see FIGS. 2-4). The inner plate 86 of the array plate assembly 60 is designed to distribute a more uniform compressive spring force against the cell stack.

The amount of compressive spring force applied by the spring feature 70 may be tuned to achieve any desired compressive force for any cell stack. In an embodiment, the compressive spring force applied by the spring feature 70 can be changed by changing the thickness of the material of the webs 80 and the contacting surfaces 78, stacking one or more spring plates 88 together, etc.

Figure 13:
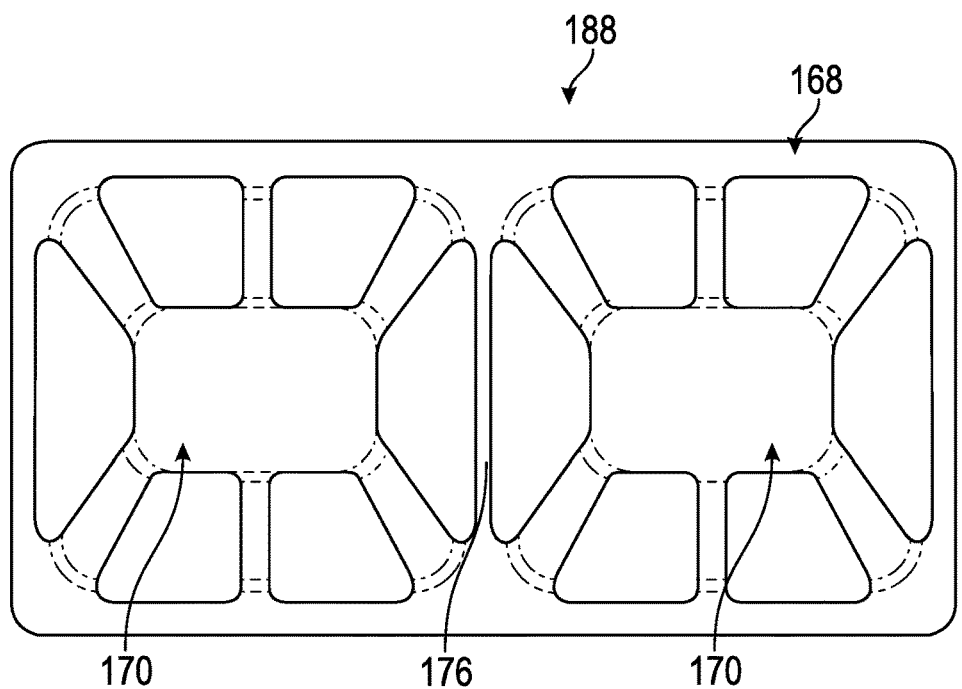
FIG. 13 illustrates another exemplary spring plate for a battery assembly.

FIG. 13 illustrates another exemplary spring plate 188. The spring plate 188 includes a plate body 168 and multiple spring features 170 that protrude from the plate body 168. In the illustrated embodiment, the spring plate 188 includes two spring features 170. However, it should be understood that the spring plate 188 could be designed to include any amount of spring features 170 within the scope of this disclosure. The spring plate 188 may be configured to exert a compressive spring force against more than one battery assembly of a battery pack or against a cell stack that includes battery cells having relatively large widths.

In this embodiment, the plate body 168 of the spring plate 188 includes a center beam 176 that extends between the spring features 170 of the spring plate 188. The center beam 176 provides structural support to the spring plate 188.

The exemplary battery assemblies of this disclosure include array plate assemblies equipped with one or more integrated spring plates. The spring plates include spring-like features capable of holding a cell stack in compression by exerting a compressive spring force against the stack. The proposed designs eliminate the need to provide foam pads between the stack and the plates. The proposed designs therefore utilize less parts and hence reduce costs and assembly times.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a grouping of battery cells; and
an array plate assembly contacting at least one cell of the grouping of battery cells, the array plate assembly including a spring plate adapted to exert a compressive spring force against the at least one cell,
wherein the array plate assembly includes an outer plate and an inner plate, and the spring plate extends between the outer plate and the inner plate,
wherein the spring plate includes a plate body and a spring feature that protrudes from the plate body.

2. The battery assembly as recited in claim 1, wherein the array plate assembly is positioned at a longitudinal extent of the grouping of battery cells.

3. The battery assembly as recited in claim 1, wherein the array plate assembly is positioned along a side of the grouping of battery cells.

4. The battery assembly as recited in claim 1, wherein the spring feature is movable between an expanded position and a retracted position as a profile of the at least one cell changes.

5. The battery assembly as recited in claim 4, wherein the profile is alterable between a first profile and a second profile that is at least partially bulged relative to the first profile.

6. The battery assembly as recited in claim 1, comprising a second spring feature that protrudes from the plate body.

7. The battery assembly as recited in claim 1, wherein the spring plate includes a contacting surface contiguous with the inner plate and an outer perimeter contiguous with the outer plate.

8. The battery assembly as recited in claim 1, wherein the spring feature includes a contacting surface and a plurality of webs.

9. The battery assembly as recited in claim 8, wherein at least one of the contacting surface and the plurality of webs is flexible in response to a dimensional change of the grouping of battery cells.

10. The battery assembly as recited in claim 8, wherein each of the plurality of webs extends between the contacting surface and an outer perimeter of the spring plate.

11. The battery assembly as recited in claim 8, comprising an opening disposed between adjacent webs of the plurality of webs.

12. The battery assembly as recited in claim 1, wherein the spring plate includes a second spring feature adjacent to the spring feature.

13. The battery assembly as recited in claim 12, comprising a center beam extending between the spring feature and the second spring feature.

14. A method, comprising:
applying a compressive spring force against a grouping of battery cells of a battery assembly with an array plate assembly, the array plate assembly including a spring plate for exerting the compressive spring force based on a dimensional profile of the grouping of battery cells,
wherein the array plate assembly includes an outer plate and an inner plate, and the spring plate extends between the outer plate and the inner plate,
wherein the spring plate includes a plate body and a spring feature that protrudes from the plate body.

15. The method as recited in claim 14, wherein the spring feature of the spring plate moves toward a retracted position in response to at least one cell of the grouping of battery cells moving toward a more bulged profile.

16. The method as recited in claim 14, wherein the spring feature of the spring plate moves toward an expanded position in response to at least one cell of the grouping of battery cells moving toward a less bulged profile.

17. The method as recited in claim 14, wherein the spring feature of the spring plate includes a contacting surface contiguous with either at least one cell of the grouping of battery cells or an inner plate of the array plate assembly.

18. The method as recited in claim 17, wherein the spring feature includes a plurality of flexible webs, and at least one of the contacting surface and the plurality of flexible webs moves in response to a change in the dimensional profile in order to maintain the compressive spring force.

19. The battery assembly as recited in claim 1, wherein the grouping of battery cells includes a plurality of array frames and a plurality of battery cells held within the plurality of array frames.

20. The battery assembly as recited in claim 19, comprising a rod extending through the spring plate and the plurality of array frames.

21. The battery assembly as recited in claim 1, wherein the plate body of the spring plate contacts the outer plate, and the spring feature of the spring plate contacts the inner plate.

22. The battery assembly as recited in claim 1, wherein the inner plate is contiguous with the at least one cell of the grouping of battery cells, and the outer plate is non-contiguous with the inner plate.

23. The battery assembly as recited in claim 1, wherein the plate body of the spring plate includes an outer perimeter that is either square or rectangular.

24. The battery assembly as recited in claim 1, wherein the plate body and the spring feature establish a monolithic part.

25. A battery assembly, comprising:
a grouping of battery cells; and
an array plate assembly including an inner plate contacting at least one cell of the grouping of battery cells, an outer plate spaced apart from the inner plate, and a spring plate positioned between the inner plate and the outer plate and configured to exert a compressive spring force against the inner plate,
wherein the spring plate includes a plate body that contacts the outer plate and a spring feature that is integral with the plate body and positioned in contact with the inner plate.

* * * * *